(12) United States Patent
Vanzuilen

(10) Patent No.: US 6,316,935 B1
(45) Date of Patent: *Nov. 13, 2001

(54) SENSOR OF ANGLE OF A SHAFT WITH A BASE SEPARATING THE SHAFT FROM A MAGNETORESISTIVE SENSING ELEMENT

(75) Inventor: David M. Vanzuilen, Fremont, IN (US)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/327,995

(22) Filed: Jun. 8, 1999

(51) Int. Cl.⁷ ..................................................... G01B 7/14
(52) U.S. Cl. ................................ 324/207.21; 324/207.25
(58) Field of Search ...................... 324/207.21, 207.17, 324/207.5, 507.25, 251, 252; 360/79; 316/261; 73/118.1; 174/52.4

(56) References Cited

U.S. PATENT DOCUMENTS

| | | |
|---|---|---|
| 3,777,273 | 12/1973 | Baba et al. . |
| 4,555,120 | 11/1985 | Frait et al. . |
| 4,893,502 * | 1/1990 | Kubota et al. ........................ 73/118.1 |
| 5,033,798 | 7/1991 | Breen . |
| 5,055,781 * | 10/1991 | Sakakibara et al. ............ 324/207.21 |
| 5,152,544 | 10/1992 | Dierker, Jr. et al. . |
| 5,194,695 * | 3/1993 | Maslakow ............................ 174/52.4 |
| 5,208,532 | 5/1993 | Alfors . |
| 5,270,645 | 12/1993 | Wheeler et al. . |
| 5,278,497 * | 1/1994 | Ariyoshi ........................ 324/207.21 |
| 5,332,965 | 7/1994 | Wolf et al. . |
| 5,444,369 | 8/1995 | Luetzow . |
| 5,625,289 * | 4/1997 | Daetz et al. ..................... 324/207.14 |
| 5,698,778 | 12/1997 | Ban et al. . |
| 5,757,179 | 5/1998 | McCurley et al. . |
| 5,807,630 * | 9/1998 | Christie et al. ....................... 428/323 |

* cited by examiner

Primary Examiner—Safet Metjahic
Assistant Examiner—Subhash Zaveri
(74) Attorney, Agent, or Firm—Martin A. Farber

(57) ABSTRACT

A sensor for measurement of shaft angle values of a rotatable magnetized shaft employs a plurality of bridge circuits with corresponding magnetoresistive sensing elements disposed spaced-apart from a magnet disposed in an end of the shaft. The bridge circuits are held by a base which includes a cavity for receipt of the end of the shaft having the magnet. A housing secures the shaft and positions the shaft for rotation within the cavity. The base is formed of polybutalene teraphthallate which is permeable to magnetic lines of force, thereby permitting a coupling of the magnetic field of the shaft to the magnetoresistive sensors for measurement of an angle of the shaft about the shaft axis.

10 Claims, 9 Drawing Sheets

SENSOR OF ANGLE OF A SHAFT WITH A BASE SEPARATING THE SHAFT FROM A MAGNETORESISTIVE SENSING ELEMENT

BACKGROUND OF THE INVENTION

This invention relates to a shaft angle sensor suitable for use in an automotive environment, and more particularly, to a shaft angle sensor employing magneto-resistive material for reduced sensitivity to spacing between rotary and stationary elements of the sensor.

In the use of electrical and electromechanical systems in an automobile, it is often necessary to employ an angle sensor to provide an indication of an angle of rotation of a rotatable component relative to a fixed component in the automobile. By way of examples, electrical circuitry is employed: (1) in the operation of a throttle body and/or carburetor with respect to the positioning of a butterfly valve, (2) in conjunction with the positioning of a throttle pedal for feeding fuel to an engine, (3) in conjunction with measurement of rotational angle of shaft used in rotary chassis height sensor equipment, (4) in an electronic throttle body sensor for regulating fuel to an engine, as well as in (5) operation of brake, clutch and positioning of a gear selection, by way of example. It is desirable to have such sensing of rotational angle to be accomplished precisely for optimum operation of the foregoing components of the automobile. However, the automobile represents a hostile environment to the employment of such sensors because of vibration, dirt, and temperature variations, as well as to mechanical concerns of tolerance, spacing, displacement, shaft and bearing wear. A further difficulty arises in the fabrication of the sensor for the automotive environment wherein there is need for excessive precision in the assembly of the sensor.

SUMMARY OF THE INVENTION

The aforementioned problems are overcome and other advantages are provided by a shaft-angle sensor which, in accordance with the invention, comprises a rotatable magnet shaft placed adjacent a bridge circuit having a magnetoresistive (MR) sensing element which determines an angle of the flux of the magnetic shaft. Preferably, a double bridge circuit with a pair of the MR sensing elements is employed, wherein the two bridge circuits are rotated 45 degrees relative to each other to provide the equivalent of sine and cosine components of a measure of the magnetic field produced by a magnet in the end of the magnet shaft. A characteristic of the MR sensor is its ability to measure magnetic field angle while being tolerant to displacement between the rotary and the fixed portions of the sensor. This tolerance to displacement is attained by a fabrication of the sensor with a base of plastic material which is essentially transparent to the magnetic field, wherein the base provides a support for the bridge circuits, and also forms a cavity for receiving a magnetized end of the magnet shaft. Use of the plastic base permits the sensor to be fabricated of circuit components which are later assembled and, wherein, a slight displacement from optimum placement of the components has no more than a negligible error in the measurement due to the tolerance of the MR sensing element to displacement between the rotary and the fixed parts of the sensor. In addition, the plastic material is resistant to moisture and is temperature stable.

BRIEF DESCRIPTION OF THE DRAWING

The aforementioned aspects and other features of the invention are explained in the following description, taken in connection with the accompanying drawing figures wherein.

DETAILED DESCRIPTION OF THE INVENTION

Figure 1:
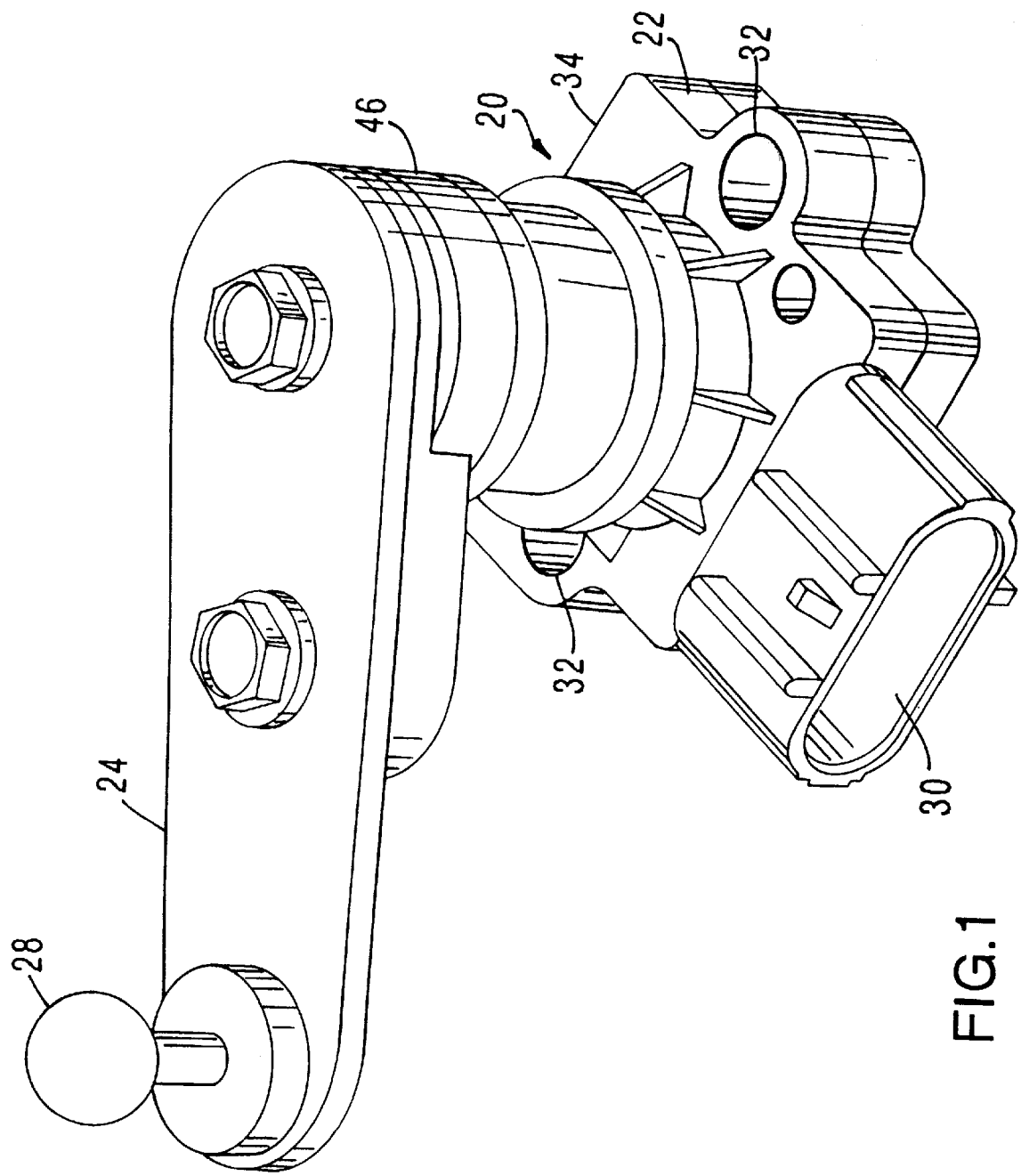
FIG. 1 is an isometric view of an angle sensor configured for use of a rotary chassis height sensor.

With reference to FIG. 1, there is shown a sensor 20 suitable for use as a rotary chassis height sensor (RCHS) in connection with a linkage employed in a connection of an automobile body to the wheels of the automobile. The sensor comprises a housing 22 and a lever arm 24 extending from a shaft 26 (shown in FIG. 2) for rotation about an axis of the shaft 26 relative to the housing 22. At the end of the arm 24, there is located a ball joint 28 for pivotally connecting with an arm of the support linkage (not shown) of the automobile, such that changes in a vertical displacement of the vehicle body relative to the ground result in a pivoting of the arm 24 relative to the housing 22. A socket 30 provides for receipt of the plug of an electrical cable (not shown) for activating electrical circuitry within the sensor 20. The housing 22 is provided with bores 32 for receipt of mounting lugs (not shown) by which the sensor 20 is secured to a mounting support, such as a frame of the vehicle body (not shown).

Figure 2:
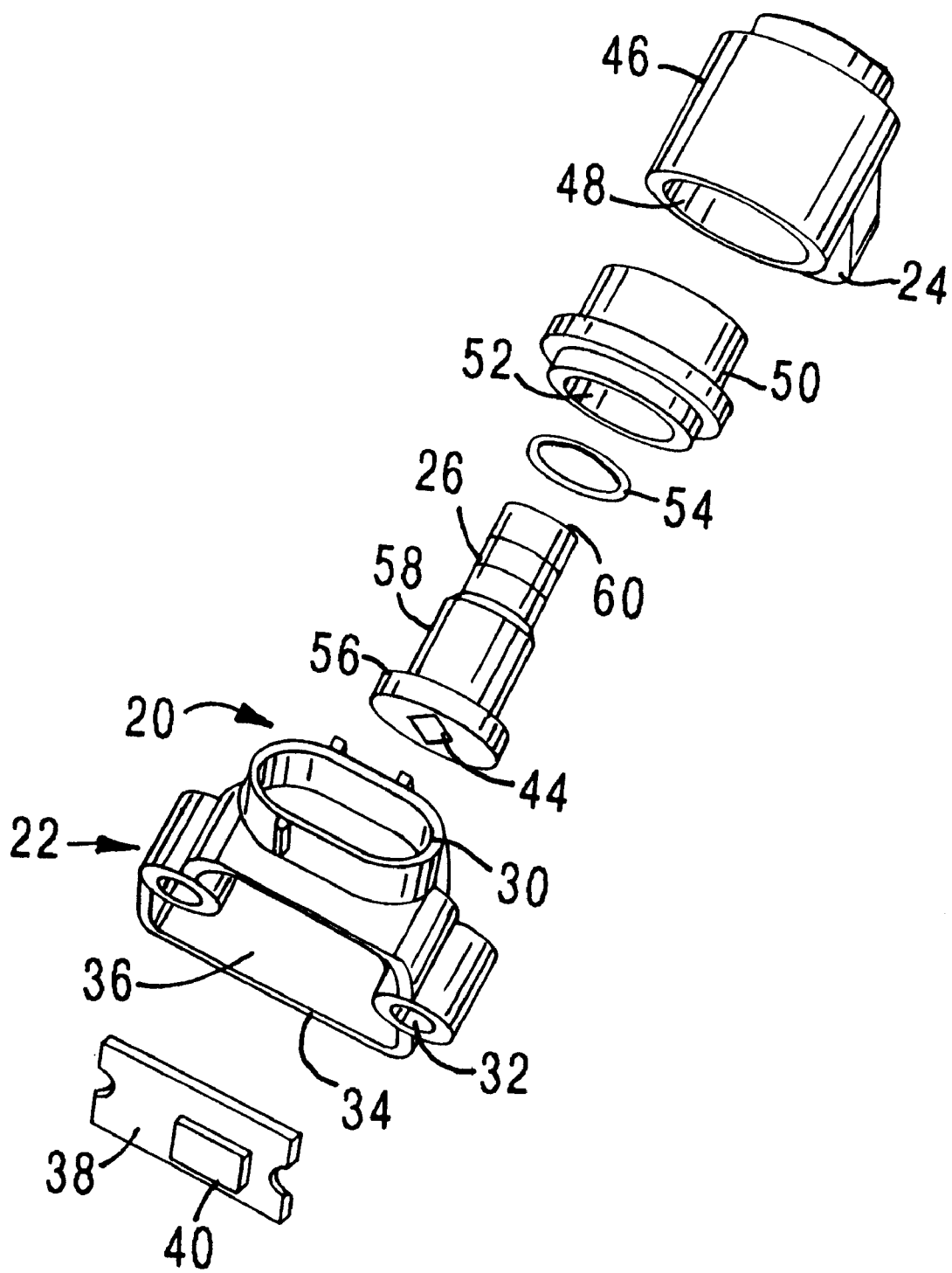
FIG. 2 is an exploded view of the angle sensor of FIG. 1.
Figure 3:
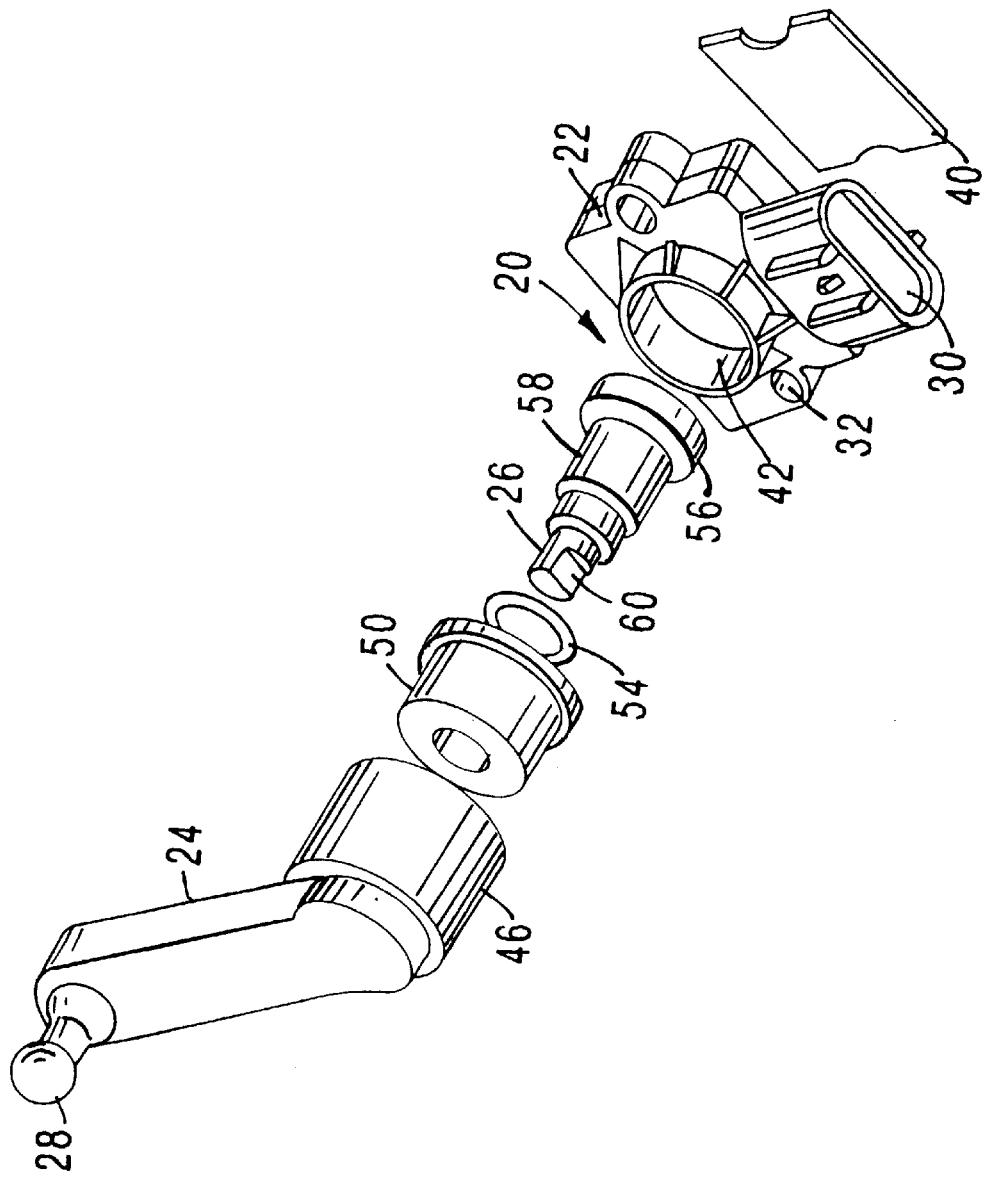
FIG. 3 is a further exploded view of the angle sensor of FIG. 1.

As shown in FIGS. 2 and 3, the housing 22 includes a base 34 which is provided with a cavity 36 at a bottom thereof for receiving a printed circuit board 38 having magnetoresistive MR circuitry 40 thereon. Electrical connection with the MR circuitry 40, which circuitry may be constructed in the form of a bridge, by way of example, is made via the socket 30. The top portion of the base 34 defines a cup 42 in the form of a cylindrical cavity for receiving a bottom end of the shaft 26. A permanent magnet 44 is secured to the bottom end of the shaft 26, and is received within the cup 42 upon insertion of the shaft 26 into the cup 42. Both the permanent magnet 44 and the bridge circuitry 40 are aligned with the axis of the shaft 26, upon insertion of the shaft 26 within the cup 42, so that the bridge circuitry 40 is located directly beneath the magnet 44, and is separated therefrom by a relatively small distance, or gap, defined by the thickness of the floor of the cavity 36. Both the cup 42 and the shaft 26 are provided with circular cylindrical surfaces so as to permit rotation of the shaft 26 within the cup 42.

The lever arm 24 is constructed with a base socket 46 having a circular cylindrical cavity 48 for receipt of a cover housing 50 which also has a circular cylindrical shape. The cover housing 50 has a cavity 52 for receiving the top end of the shaft 26 upon the interposition of an O-ring 54 about the top portion of the shaft 26 and in abutment with a flange 56 of the shaft 26. Encircling the midpoint of the shaft 26 is a sleeve serving as a slide bearing 58 enabling rotation of the shaft 26 within the cover housing 50. The top end of the shaft 26 is fashioned with a flat surface to form a key 60 in the configuration of the letter D. The key 60 mates with interior surface of the cavity 48 at a base terminus of the lever arm 24, whereby rotation of the arm 24 is transmitted to the shaft 26.

Figure 4:
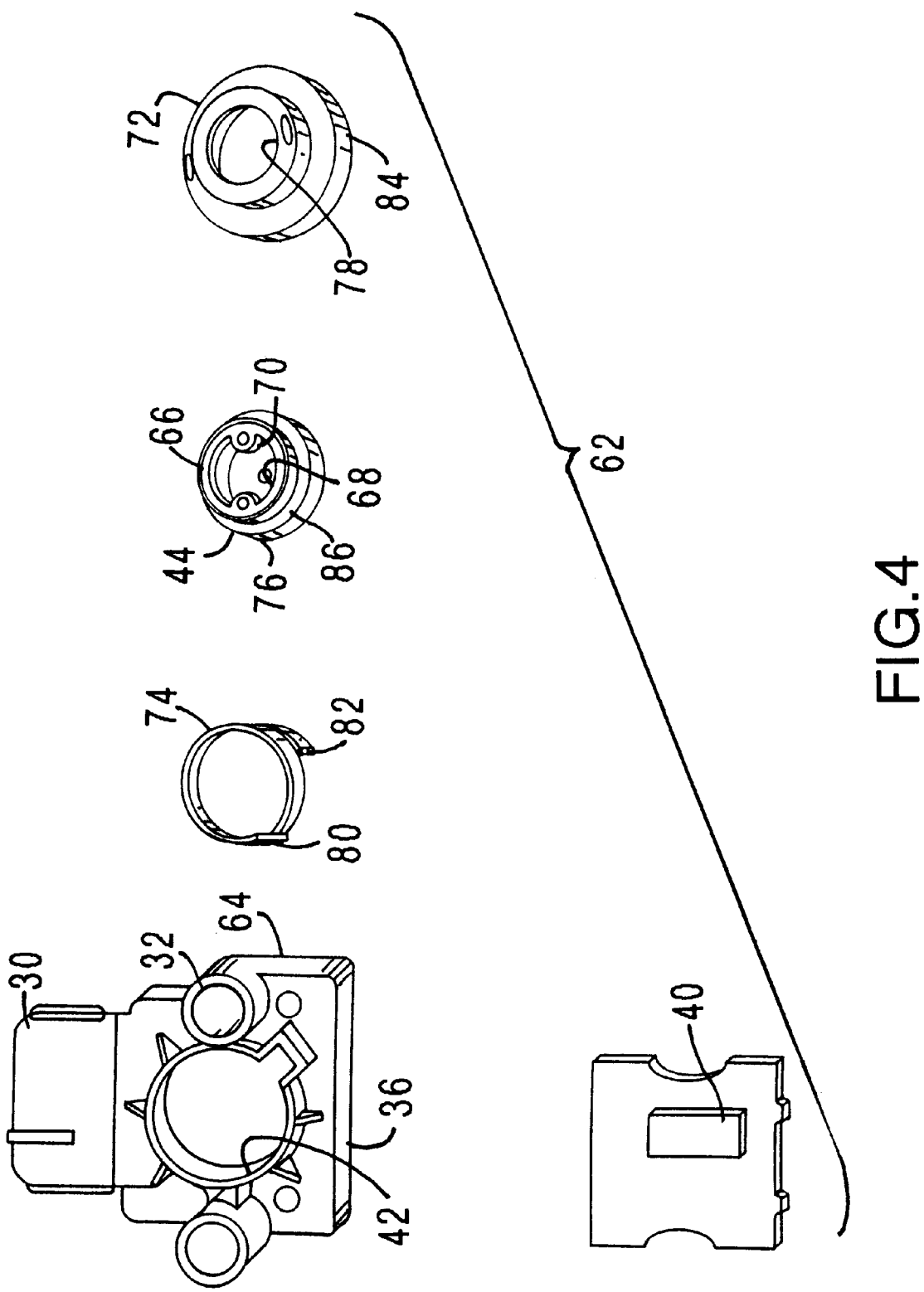
FIG. 4 is an exploded view, with the components shown in side-by-side arrangement, of a further embodiment of the angle sensor suitable for use as a throttle position sensor.
Figure 5:
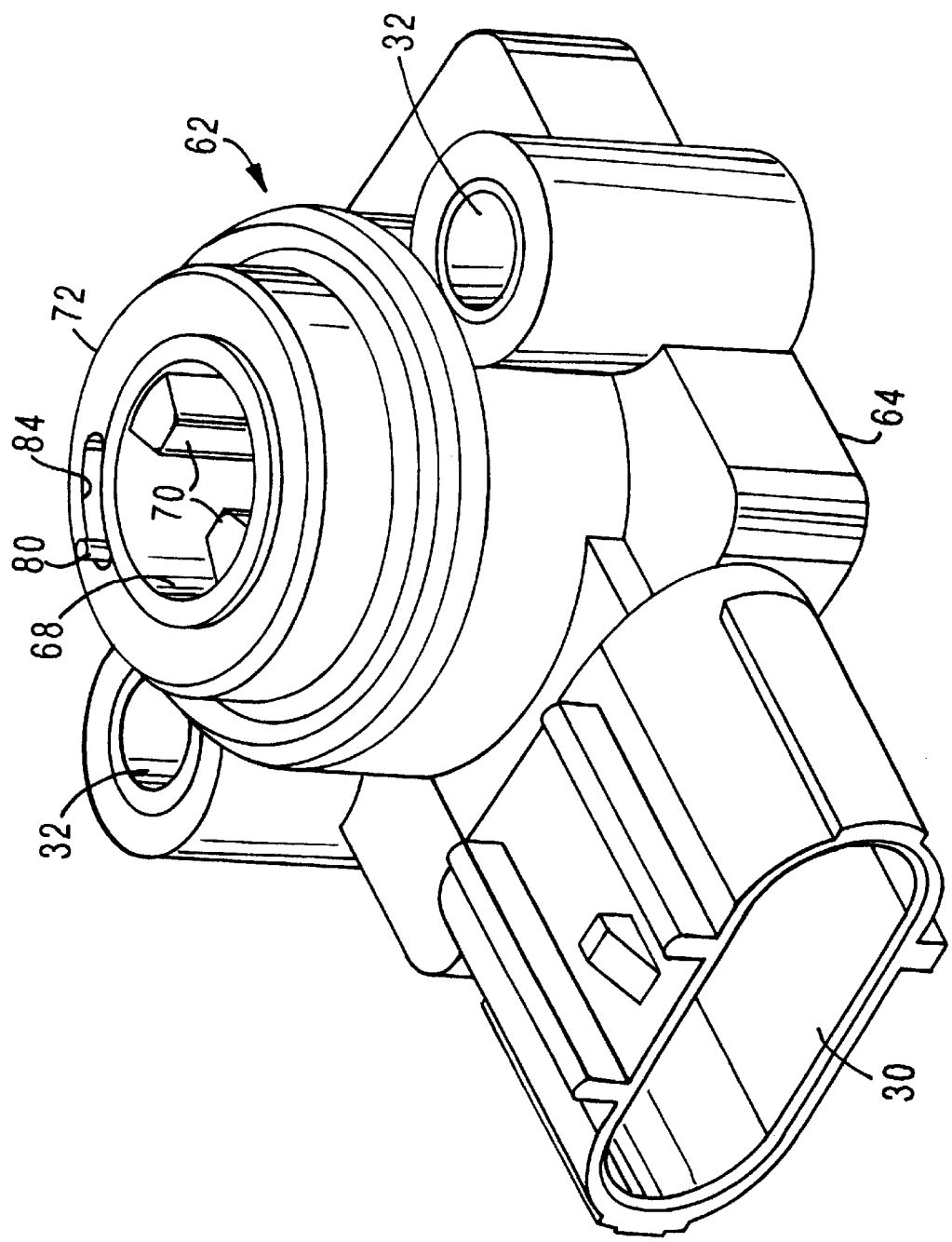
FIG. 5 is an exterior view of the angle sensor of FIG. 4.

With reference to FIGS. 4–5, an alternative embodiment of the invention is shown as sensor 62. The sensor 62 includes a base 64 which supports the electrical connection socket 30 and includes the mounting bores 32. The base 64 includes the cavity 36, at the bottom side thereof, for receipt of the MR bridge circuitry 40, and includes also the cup 42 at the top side thereof for receipt of and for mating with the keyway of a magnet carrying shaft 66. The shaft 66 is a relatively short shaft, or stub shaft, and includes a top recess 68 with a key 70 for receipt of an external drive shaft (not shown). The bottom side of the shaft 66 carries the permanent magnet 44 and, upon emplacement of the shaft 66 within the cup 42, positions the magnet 44 in alignment with the MR bridge circuitry 40. A cover 72 is secured to the top of the base 64. Upon assembly of the sensor 62, the shaft 66 is placed within the cup 42, a circular spring 74 is disposed around the shaft 66 and rests upon a flange 76 of the shaft 66, and the cover 72 is placed above the shaft 66 allowing an end of the shaft 66 to protrude through an aperture 78 of the cover 72. Tabs 80 and 82 extend in an axial direction from the spring 74 to engage, respectively, a slot 84 in the cover 72 and a notch 86 in the flange 76 to provide a limitation on the amount of rotation which can be applied to the shaft 66. The spring 74 pushes against the interior of the cover 72 and against the flange 76 of the shaft 66 to insure contact of the magnet 44 with the floor of the cup 42.

Figure 6:
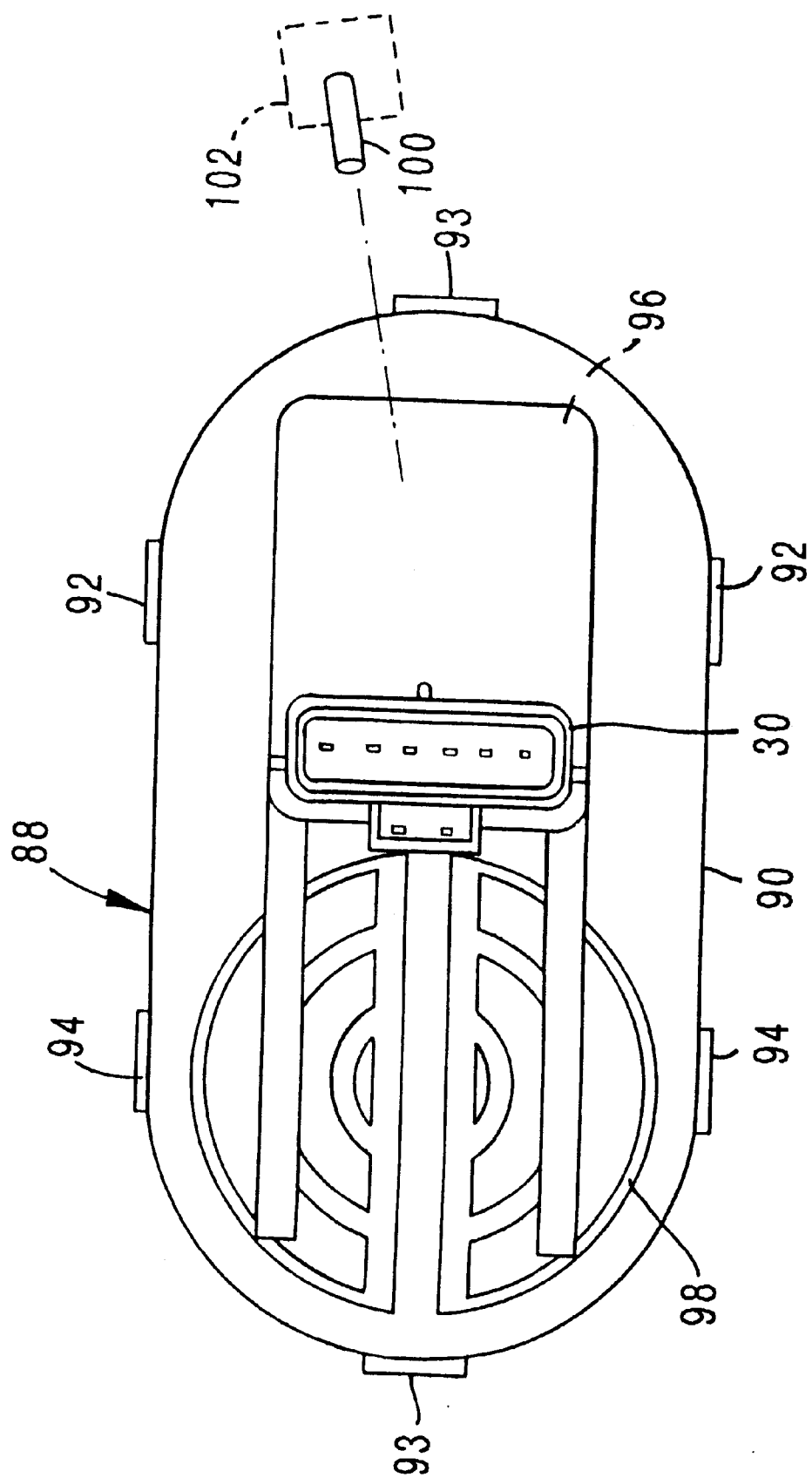
FIGS. 6 and 7 show top and bottom views of a further embodiment of the invention, suitable for use as an electronic throttle body sensor.
Figure 7:
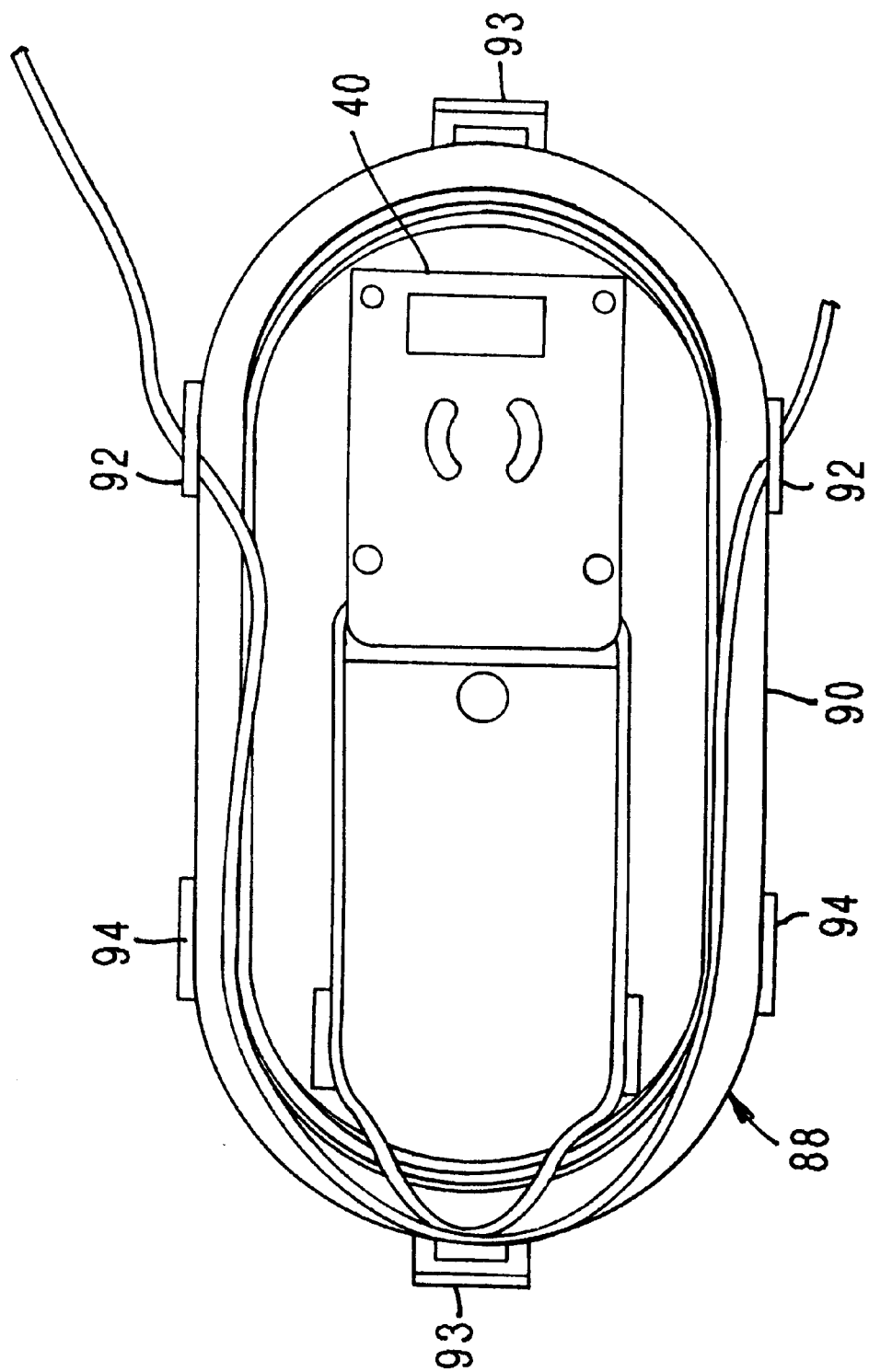

With reference to FIGS. 6 and 7, there is shown an alternative embodiment of the sensor, indicated as sensor 88. The sensor 88 includes a base 90 which supports the socket 30 for making connection with an external circuit. The sensor 88 has the feature of being only partially assembled, thereby to allow an equipment manufacturer to provide for final assembly of the components of the sensor 88 upon the occasion of construction of a device, such as a carburetor, which incorporates the sensor 88 as part of the overall equipment assembly. In the ensuring description, reference will be made to the carburetor for convenience, it being understood that the description applies equally to a throttle body. Tabs 92, 93 and 94 extend from the base 90 to provide for further connection of electric lines, such as power lines, by way of example, to circuitry supported by the base 90. In particular, such circuitry includes the MR circuitry 40 located within a cavity 96 located within a back side of the base 90.

With reference to the example of the connection of the sensor to a carburetor, it is the practice in construction of certain forms of carburetors to employ an electric motor (not shown) for positioning a valve element within the carburetor. A mounting region 98 is provided on the base 90 and serves for holding the electric motor. Upon a fixing of the base 90 to a frame element of the carburetor, the electric motor is positioned for mechanical engagement with a drive shaft assembly of the carburetor valve. A magnet carrying shaft 100 is supported within a suitable housing 102, indicated in phantom view, for positioning the shaft 100 in alignment with the MR circuitry 40. Due to the tolerance of MR sensor circuitry to positioning of the magnet, as will be described herein, great precision in the locating of the magnet carrying shaft 100 relative to the MR circuitry 40 is not required such that the housing 102 can be connected also to a frame element of the carburetor. This avoids the necessity of having the housing 102 and the base 90 being connected together prior to final assembly of the carburetor and its ancillary equipment.

All embodiments of the shaft angle sensor share certain common structural features. The printed circuit board of the MR circuitry includes a pair of bridge circuits having sensing elements comprising permalloy magnetoresistive material for sensing the magnetic field. The bridge circuits are rotated 45° relative to each other to provide the equivalent of sine and cosine measures of the magnetic field produced by the magnet in the bottom of the magnet shaft. This magnet is a rectangular shaped magnet having a single north pole and a single south pole. The magnet of the magnet shaft contacts the bottom of the cylindrical cavity, or cup, of the base to slide thereon upon rotation of the shaft relative to the cavity. The base is fabricated of a material known as Valox, this being a plastic material having the chemical name polybutalene teraphthallate mixed with fibrous glass. This plastic is manufactured by General Electric and is moisture resistant and temperature stable, ideal for the automobile environment. The cover of the housing is fabricated of polybutylene teraphallate, the shaft comprises Teflon (a fluorinated hydrocarbon) impregnated with nylon and glass fiber, and there is an ultrasonic weld between the cover and the base, which weld permits rotation of the shaft relative to the base. A feature in the use of this plastic material is the fact that magnetic field lines of the magnet of the magnet shaft can go straight through the floor of the cylindrical cavity to permeate the magnetoresistive material in the sensing elements.

The advantage of using the angle sensor of the invention, as compared to other sensors of the prior art, may be understood in terms of the theory of operation of the angle sensor of the invention. This may be explained by comparing operation of a magnetoresistive sensor to a Hall-effect magnetic field sensor. There is an important distinction between the use of a Hall-effect magnetic field sensor and the magnetoresistive sensor. The Hall-effect sensor outputs a signal having an amplitude which is very sensitive to the amplitude of the magnetic field impinging upon the sensor. The signal outputted by the magnetoresistive sensor is dependent primarily upon the direction of the magnetic field and is only slightly affected by the magnitude of the impinging magnetic field.

As a result, location of the Hall-effect sensor relative to the source of the magnetic field is critical for obtaining a proper measure of the field strength. Any deviation from anticipated location, as might occur with normal mechanical tolerances or vibration in the use of the automotive vehicle would introduce an error in the measurement of the field strength. This error, in terms of a fraction of the entire field strength, is sufficient to introduce an excessively large error in the measurement of the angle of the shaft which holds the magnet. In contrast, use of the magnetoresistive material of the present invention provides essentially the same accuracy to measurement of shaft angle irrespectively of whether the magnetoresistive material be offset from a desired location, either in terms of displacement in a direction along the shaft axis, or in a direction transverse to the shaft axis.

The double bridge circuit of the magneto-resistive material is available commercially and is made by Philips. The total permitted rotation of the magnet shaft, by way of example is limited to 90° of total travel by the stops on the magnet shaft and the projections of the spring in the embodiments of the throttle position sensor. The spring also serves the function of providing pre-stressing of the magnet shaft in terms of rotational angle to insure that there is no lash during an imparting of rotation by an external driver shaft to the magnet shaft. With respect to the relative insensitivity of the magnetoresistive sensor to position relative to the source of a magnetic field, it is noted that a nominal thickness of the plastic floor of the cylindrical cavity does not interfere with the operation of the magnetoresistive field sensor. In fact, it may be possible to have a thickness as large as one-quarter inch, this thickness constituting the gap between the sensor and the magnet. With respect to measurement errors experienced by the MR sensor, the error in degrees is proportional to the square of an offset in the central axis of an MR array from the desired location of the axis, and inversely proportional to the square of the diameter or diagonal of the array.

Figure 8:
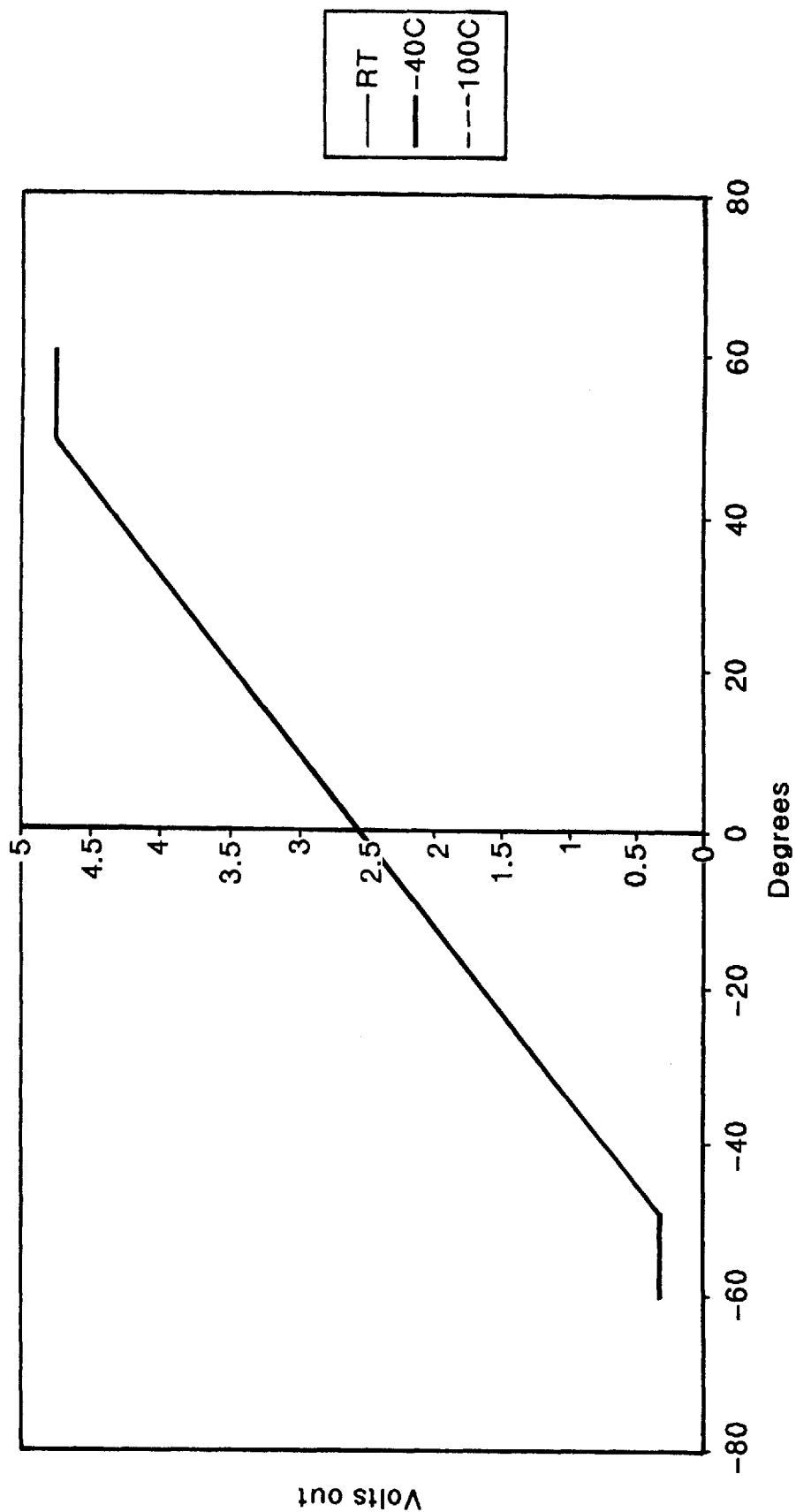
FIGS. 8 and 9 are graphs showing output signals of the MR sensors.
Figure 9:
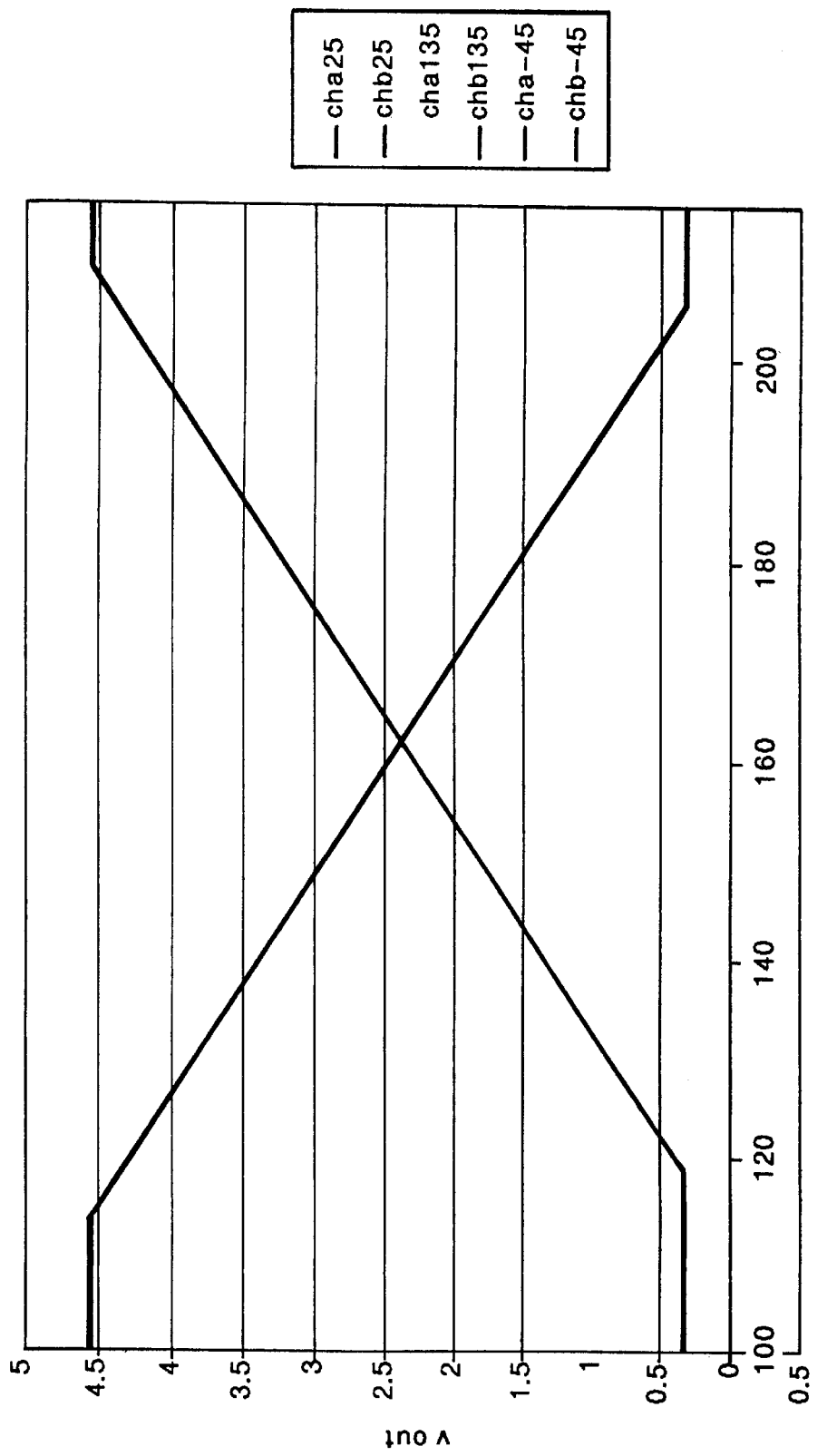

With respect to FIGS. 8 and 9, it is noted that the preferred embodiment of the invention employs a pair of MR bridge circuits which serve as redundant sensors. FIG. 8 represents the output voltage of a single bridge circuit as a function of angle for the situations of three different temperature environments, namely room temperature (RT), −40 degrees Celsius, and +100 degrees Celsius. The three graphs for the three different temperatures virtually overlap due to the temperature stability of the sensor circuit.

FIG. 9 demonstrates the case for the two sensor bridge circuits, wherein one of the circuits is portrayed as channel a (cha) and the other of the two sensor bridge circuits is portrayed as channel b (chb). The outputs of the two bridge circuits are inverted to facilitate a showing of the relationship of voltage versus angle for such channel. Three different temperature ranges are also indicated, namely +25° C., +135° C., and −45° C., wherein the graphs virtually overlap for each channel due to the temperature stability of the MR bridge circuits.

I claim:

1. An angle sensor for sensing the angle of a rotatable shaft, comprising:
   a base and a circuit supported by the base on a first side thereof, said base having a cavity for receipt of an end of said rotatable shaft, said cavity being located on a second side of said base opposite said circuit, said circuit including a magnetoresistive (MR) sensor;
   a housing, said shaft being rotatable about a shaft axis, the housing holding the shaft with said end thereof disposed rotatably within said cavity upon connection of said housing to said base; and
   a magnet connected to said end of said shaft, said magnet being located within said cavity and directing a magnetic field to said sensing element upon placement of said end of said shaft in said cavity, wherein the circuit outputs a signal indicating a rotational orientation of the magnet relative to said base.

2. A sensor according to claim 1, wherein said circuit includes a pair of MR bridge circuits a first of which bridge circuits includes said MR sensor and a second of which bridge circuits includes a further MR sensor, wherein the MR sensor of the first of the bridge circuits is rotated 45 degrees relative to the MR sensor of the second of the bridge circuits, said circuit providing the angle of rotation of said shaft.

3. A sensor according to claim 1, wherein the base comprises a material transparent to a magnetic field.

4. A sensor according to claim 3, wherein the material of said base comprises polybutylene teraphthallate.

5. A sensor according to claim 1, wherein said housing includes a cover fabricated of polybutylene teraphallate, said base being fabricated of polybutylene teraphthallate, and said shaft comprising Teflon (a fluorinated hydrocarbon) impregnated with nylon and glass fiber, there being an ultrasonic weld between said cover and said base, which weld permits rotation of said shaft relative to said base.

6. A sensor according to claim 1, wherein the end of said shaft is a first end, and wherein said shaft comprises a second end opposite said first end, said shaft comprising a cavity located in said second end for receipt of an external driver having the form of a shaft with a key way therein, and wherein said shaft cavity comprises a corresponding key for receiving said key way.

7. A sensor according to claim 6, further comprising a spring encircling said shaft and a tooth located in a path of rotational movement of said shaft for limiting an amount of rotation of said shaft, said tooth extending from said spring, said spring holding said shaft with spring stress against said base.

8. A method of fabricating an angle sensor for sensing the angle of a shaft, the shaft angle sensor comprising:
   a base and a circuit supported by the base on a first side thereof, said base being fabricated of a material transparent to a magnetic field, said base having a cavity for receipt of an end of said rotatable shaft, said cavity being located on a second side of said base opposite said circuit, said circuit including a magnetoresistive sensing element;
   a housing, said shaft being rotatable about a shaft axis, the housing holding the shaft with said end thereof disposed rotatably within said cavity upon connection of said housing to said base; and
   a magnet connected to said end of said shaft, said magnet directing a magnetic field to said sensing element upon emplacement of said end of said shaft in said cavity, wherein the circuit outputs a signal indicating a rotational orientation of the magnet relative to said base;
   wherein the method comprises the steps of constructing said base of material transparent to the magnetic field with the base having said first side for holding said circuit and with said cavity located on said second side opposite said first side, constructing said housing with a cover, fabricating said cover of polybutalene teraphthallate, fabricating said base of polybutalene teraphthallate, fabricating said shaft of a composition of Teflon (a fluorinated hydrocarbon) impregnated with nylon and glass fiber, ultrasonically welding said cover to said base, said composition of said shaft inhibiting a welding of said shaft to said base and to said cover, thereby permitting rotation of said shaft relative to said base and to said cover, and placing said end of said shaft with the magnet in said cavity so that the magnetically transparent material of the base is located between the magnet and the magnetoresistive sensing element of said circuit.

9. A shaft angle sensor, comprising:
   a rotatable shaft and a base of magnetically transparent material, said base being configured for receipt of said rotatable shaft;
   a circuit having a magnetoresistive (MR) sensor, said circuit being located on a first side of said base opposite an end of said shaft which is located on a second side of said base;
   a housing positioning said shaft relative to said base;
   a magnet located at an end of said shaft and directing a magnetic field of the magnet to said MR sensor, said MR sensor being operative to output a signal to said circuit for indicating an orientation of said magnetic field, said circuit being responsive to the signal outputted by said MR sensor to provide an orientation of said shaft, there being a cavity located on the second side of said base for receiving said shaft and said magnet and for locating said magnet with respect to said MR sensor.

10. A shaft angle sensor according to claim 9, wherein said MR sensor is a first MR sensor and said circuit further comprises a second MR sensor, said first MR sensor and said second MR sensor being oriented at 45 degrees relative to each other, said circuit being responsive also to a signal outputted by said second MR sensor to provide the orientation of said shaft.

* * * * *